(12) United States Patent
Burton (10) Patent No.: US 7,424,552 B2
(45) Date of Patent: *Sep. 9, 2008

(54) SWITCH/NETWORK ADAPTER PORT INCORPORATING SHARED MEMORY RESOURCES SELECTIVELY ACCESSIBLE BY A DIRECT EXECUTION LOGIC ELEMENT AND ONE OR MORE DENSE LOGIC DEVICES

(75) Inventor: Lee A. Burton, Divide, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 431 days.

This patent is subject to a terminal disclaimer.

(21) Appl. No.: 10/618,041

(22) Filed: Jul. 11, 2003

(65) Prior Publication Data

US 2004/0019703 A1 Jan. 29, 2004

Related U.S. Application Data (60) Continuation-in-part of application No. 10/340,390, filed on Jan. 10, 2003, now Pat. No. 7,197,575, which is a continuation-in-part of application No. 09/932,330, filed on Aug. 17, 2001, now Pat. No. 7,373,440, which is a continuation-in-part of application No. 09/755,744, filed on Jan. 5, 2001, now abandoned, which is a division of application No. 09/481,902, filed on Jan. 12, 2000, now Pat. No. 6,247,110, which is a continuation of application No. 08/992,763, filed on Dec. 17, 1997, now Pat. No. 6,076,152.

(51) Int. Cl.
*G06F 15/16* (2006.01)

(52) U.S. Cl. .................... 709/250; 710/62; 710/105; 370/463

(58) Field of Classification Search ............. None
See application file for complete search history.

(56) References Cited

U.S. PATENT DOCUMENTS 4,452,700 A 6/1984 Schneider et al.
4,783,730 A 11/1988 Fischer (Continued)

FOREIGN PATENT DOCUMENTS

JP 59-206972 11/1984
JP 63-086079 4/1988

OTHER PUBLICATIONS

PCI Technology Overview, Feb. 2003, Digi International, www.digi.com/pdf/prd_msc_pcitech.pdf, pp. 1-22.*
FreeBSD Developers' Handbook Chapter 9, 1995, members.datafast.net.au/dft0802/specs/pcixpfaq.pdf, pp. 1-12.*

(Continued)

*Primary Examiner*—Eron J Sorrell
(74) *Attorney, Agent, or Firm*—William J. Kubida; Michael C. Martensen; Hogan & Hartson LLP (57) ABSTRACT

An enhanced switch/network adapter port ("SNAP™") including collocated shared memory resources ("SNAPM™") in a dual in-line memory module ("DIMM") or any other memory module format for clustered computing systems employing direct execution logic such as multi-adaptive processor elements ("MAP®", all trademarks of SRC Computers, Inc.). Functionally, the SNAPM modules incorporate and properly allocate memory resources so that the memory appears to the associated dense logic device(s) (e.g. a microprocessor) to be functionally like any other system memory such that no time penalties are incurred when accessing it. Through the use of a programmable access coordination mechanism, the control of this memory can be handed off to the SNAPM memory controller and, once in control, the controller can move data between the shared memory resources and the computer network such that the transfer is performed at the maximum rate that the memory devices themselves can sustain. This provides the highest performance link to the other network devices such as MAP® elements, common memory boards and the like.

82 Claims, 6 Drawing Sheets

U.S. PATENT DOCUMENTS

| | | | |
|---|---|---|---|
| 4,972,457 | A * | 11/1990 | O'Sullivan ............... 455/556.1 |
| 5,230,057 | A | 7/1993 | Shido et al. |
| 5,295,246 | A | 3/1994 | Bischoff et al. |
| 5,592,962 | A | 1/1997 | Hooberman |
| 5,673,204 | A * | 9/1997 | Klingelhofer ............... 348/578 |
| 5,889,959 | A * | 3/1999 | Whittaker et al. ........... 709/232 |
| 5,903,771 | A | 5/1999 | Sgro et al. |
| 5,915,104 | A | 6/1999 | Miller |
| 5,923,682 | A | 7/1999 | Seyyedy |
| 6,026,478 | A | 2/2000 | Dowling |
| 6,038,431 | A | 3/2000 | Fukutani et al. |
| 6,047,343 | A | 4/2000 | Olarig |
| 6,052,134 | A * | 4/2000 | Foster ........................ 345/533 |
| 6,052,773 | A | 4/2000 | DeHon et al. |
| 6,076,152 | A | 6/2000 | Huppenthal et al. |
| 6,108,730 | A | 8/2000 | Dell et al. |
| 6,148,355 | A | 11/2000 | Mahalingam |
| 6,192,439 | B1 | 2/2001 | Grunewald et al. |
| 6,202,111 | B1 | 3/2001 | Wallach et al. |
| 6,295,571 | B1 | 9/2001 | Scardamalia et al. |
| 6,326,973 | B1 | 12/2001 | Behrbaum et al. |
| 6,426,879 | B1 | 7/2002 | Take |
| 6,452,700 | B1 * | 9/2002 | Mays, Jr. ..................... 359/15 |
| 6,480,014 | B1 | 11/2002 | Li et al. |
| 6,577,621 | B1 | 6/2003 | Balachandran |
| 6,581,157 | B1 * | 6/2003 | Chiles et al. ................... 713/1 |
| 6,598,199 | B2 * | 7/2003 | Tetrick ........................ 714/766 |
| 6,633,945 | B1 | 10/2003 | Fu et al. |
| 6,799,252 | B1 | 9/2004 | Bauman |
| 6,889,959 | B2 | 5/2005 | Cholinski |

OTHER PUBLICATIONS

Agarwal, A., et al., "The Raw Compiler Project", pp. 1-12, http://gag-www.lcs.mit.edu/raw, Proceedings of the Sceond SUIF Compiler Workshop, Aug. 21-23, 1997.

Alabaharna, Osama, et al., "One the viability of FPGA-based integrated coprocessors", ©1996 IEEE, Publ. No. 0-6188-7548-9/96, pp. 206-215.

Amerson, Rick, et al., "Teremac—Configurable Custom Computing", ©1995 IEEE, Publ. No. 0-8186-7086-X/95, pp. 32-38.

Barthel, Dominique Aug. 25-26, 1997, "PVP a Parallel Video coProcessor", Hot Chips IX, pp. 203-210.

Bertin, Patrice, et al., "Programmable active memories: a performance assessment", ©1993 Massachusetts Institute of Technology, pp. 86-102.

Bittner, Ray, et al., "Computing kernels implemented with a wormhole RTR CCM", ©1997 IEEE, Publ. No. 0-8186-8159-4/97, pp. 98-105.

Buell, D., et al. "Splash 2: FPGAs in Custon Computing Machine—Chapter 1—Custom Computing Machines: An Introdiction", pp. 1-11, http://www.computer.org/espress/catalog/bp07413/spls-gh1.html (orginally believed published in J. of Supercomputing, vol. IX, 1995, pp. 219-230.

Casselman, Steven, "Virtual Computing and The Virtual Computer", ©1993 IEEE, Publ. No. 0-8186-3890-7/93, pp. 43-48.

Chan, Pak, et al., "Architectural tradeoffs in field-programmable-device-based computing systems", ©1993 IEEE, Publ. No. 0-8186-3890-7/93, pp. 152-161.

Clark, David, et al., "Supporting FPGA microporcessors through retargetable software tools", ©1996 IEEE, Publ. No. 0-8186-7548-9/96, pp. 195-103.

Cuccaro, Steven, et al., "The CM-2X: a hybrid Cm-2/Xilink prototype", ©1993 IEEE, Publ. No. 0/8186-3690-7/93, pp. 121-130.

Culbertson, W. Bruce, et al., "Exploting architectures for volume visualization on the Teramac custom computer", ©1996 IEEE, Publ. No. 0-8186-7548-9/96, pp. 80-88.

Culbertson, W. Bruce, et al., "Defect tolerance on the Teramac custom computer", ©1997 IEEE, Publ. 0-8186-8159-4/97, pp. 116-123.

Dehon, Andre, "DPGA-Coupled microprocessors: commodity IC for the 21st century", ©1994 IEEEm Publ. No. 0-8186-5490-2/94, pp. 31-39.

Dehon, A., et al., "Matrix A Reconfigurable Computing Device with Configurable Instruction Distribution", Hot Chips IX, Aug. 25-26, 1997, Stanford, Califonia, MIT Artificial Intelligence Laboratory.

Dhaussy, Philippe, et al., "Global control synthesis for an MIMD/FPGA machine", ©1994 IEEE, Publ. No. 0-8186-5490-2/94, pp. 72-81.

Elliott, Duncan, et al., "Computational Ram: a memory-SIMD hybrid and its application to DSP", ©1992 IEEE, Publ. No. 0-7803-0246-X/92, pp. 30.6.1-30.6.4.

Fortes, Jose, et al., "Systolic arrays, a survey of seven projects", ©1987 IEEE, Publ. No. 0018-9162/87/0700-0091, pp. 91-103.

Gokhale, M., et al., "Processing in Memory: The Terasys Massively Parallel PIM Array" ©Apr. 1996, IEEE, pp. 23-31.

Gunther, Bernard, et al., "Assessing Socument Relevance with Run-Time Reconfigurable Machines", ©1996 IEEE, Publ. No. 0-8186-7548-9/96, pp. 10-17.

Hagiware, Hiroshi, et al., "A dynamically microporgrammable computer with a low-level parallelisn", ©1980 IEEE, Publ. No. 0018-9340/80/07000-0577, pp. 577-594.

Hartenstein, R. W., et al., "A General Approach in System Design Integrating Reconfigurable Accelerators," http://xputers.informatik.uni-ki.de/paper/paper02B-1.html, IEEE 1996 Conference, Austin, TX, Oct. 9-11, 1996.

Hartenstein, Reiner, et al., "A reconfiguranvel data-driven ALU for Xputers", ©1994 IEEE, Publ. No. 0-8186-5490-2/94, pp. 139-146.

Hauser, John, et al.: "GARP: a MIPS processor with a recongiturable co-processor", ©1997 IEEE, Publ. No. 0-08186-8159-4/97, pp. 12-21.

Hyes, John, et al., "A microprocessor-based hypercube, supercomputer", ©1986 IEEE, Publ. No. 0272-1732/86/1000-0006, pp. 6-17.

Herpel, H. -J., et al., "A Reconfigurable Computer for Embedded Control Applications", ©1993 IEEE, Publ. No. 0-8186-3890-7/93, pp. 111-120.

Hogl, H., et al., "Enable++: A second generation FPGA processor", ©1995 IEEE, Publ. No. 0-8186-7086-X/95, pp. 45-53.

King, William, et al., "Using MORRPH in an insustrial machine vision system", ©1996.IEEE, Publ. NO. 08186-7548-9/96, pp. 18-26.

Manohar, Swaminathan, et al., "A pragmatic approach to systolic design", ©1988 IEEE, Publ. No. CH2603-9/00/0000/0483, pp. 463-472.

Mauduit, Nicolas, et al., "Lneuro 1.0: a piece of hardware LEGO for building neural network systems," ©1992 IEEE, Publ. No. 1045-9227/92, pp. 414-422.

Mirsky, Ethan A., "Coarse-Grain Reconfigurable Computing", Massachusetts Institute of Technology, Jun. 1996.

Mirsky, Ethan, et al., "MATRIX: A Reconfigurable Computing Architecture with Configurable Instruction Distribution and Deployable Resource", ©1996 IEEE, Publ. No. 0-8186-7548-9/96, pp. 157-166.

Moley, Robert E. Jr., et al., "A Massively Parallel Systolic Array Processor System", ©1988 IEEE, Publ. No. CH2603-9/88/0000/0217, pp. 217-225.

Patterson, David, et al., "A case for intelligent DRAM: IRAM", Hot Chips VIII, Aug. 19-20, 1996, pp. 75-94.

Peterson, Janes, et al., "Schedullng and partitionitng ANSI-C programs onto multi-FPGA CCM architectures", ©1996 IEEE, Publ. No. 0-8186-7548-9/96, pp. 178-187.

Schmit, Herman, "Incremental reconfiguration for pipelined applications," ©1997 IEEE, Publ. No. 0-8186-8159-4/97, pp. 47-55.

Sitkoff, Nathan, et al., "Implementing a Genetic Algorithm on a Parallel Custom Computing Machine", Publ. No. 0-8186-7086-X/95, pp. 160-187.

Stone, Harold, "A logic-in-memory computer", ©1970 IEEE, IEEE Transactions on Computers, pp. 73-78, Jan. 1990.

Tangen, Uwe, et al., "A paarallel hardware evolvable computer POLYP extended abstract", ©1997 IEEE, Publ. No. 0-8186-8159/4/97, pp. 238-239.

Thornburg, Mike, et al., "Transformable Computers", ©1994 IEEE, Publ. No. 0-8186-5602-6/94, pp. 674-679.

Tomita, Shinji, et al., "A computer low-level parallelism QA-2", ©1986 IEEE, Publ. No. 0-0384-7495/86/000/0280, pp. 280-289.

Trimberger, Steve, et al., "A time-multiplexed FPGA", ©1997 IEEE, Publ. No. 0-8186-8159-4/97, pp. 22-28.

Ueda, Hirotada, et al., "A mulriprocessor system utilizing enhanced DSP's for image processing", ©1988 IEEE, publ. No. CH2603-9/88/0000/0611, pp. 611-620.

Villasenor, John, et al., "Configuravle computing", ©1997 Scientific American, Jun. 1997.

Wang, Quiang, et al., "Automated field-programmable compute accelerator design using partial evaluation", ©1997 IEEE, Publ. No. 0-8186-8159-4/97, pp. 146-154.

W.H. Mangione-Smith and B.L. Hutchings. Configurable computing: The Road Ahead. In Proceedings of the Recognifigurable Architectures Workshop (RAW'97), pp. 81-96, 1997.

Wirthlin, Michael, et al., "The Nano processor: a low resource reconfigurable processor", ©1994 IEEE, Publ. No. 0-8186-5490-2/94, pp. 23-30.

Wirthlin, Michael, et al., "A dynamic instruction set computer", ©1995 IEEE, Publ. No. 0-8186-7086-X/96, pp. 99-107.

Wittig, Ralph, et al., "One Chip: An FPGA processor with reconfigurable logic", ©1996 IEEE, Publ. No. 0-8186-7548-9/96, pp. 126-135.

Yamauchi, Tsukasa, et al., "SOP: A reconfigurable massively parallel system and its control-data flow based compiling method", ©1996 IEEE, Publ. No. 0-6186-7548-9/96, pp. 148-156.

"Information Brief", PCI Bus Technolgoy, ©IBM Personal Computer Company, 1997, pp. 1-3.

Yun, Hyun-Kyu and Silverman, H. F.; "A distributed memory MIMD multi-computer with reconfigurable custom computing capabilities", Brown University, Dec. 10-13, 1997, pp. 7-13.

* cited by examiner

SWITCH/NETWORK ADAPTER PORT INCORPORATING SHARED MEMORY RESOURCES SELECTIVELY ACCESSIBLE BY A DIRECT EXECUTION LOGIC ELEMENT AND ONE OR MORE DENSE LOGIC DEVICES

CROSS REFERENCE TO RELATED PATENT APPLICATIONS

The present invention is a continuation-in-part application and is related to, and claims priority from, U.S. patent application Ser. No. 10/340,390 filed Jan. 10, 2003 for now U.S. Pat. No. 7,197,575: "Switch/Network Adapter Port Coupling a Reconfigurable Processing Element to One or More Microprocessors for Use With Interleaved Memory Controllers, which is a continuation-in-part application and is related to, and claims priority from, U.S. patent application Ser. No. 09/932,330 filed Aug. 17, 2001 for now U.S. Pat. No. 7,373,440: "Switch/Network Adapter Port for Clustered Computers Employing a Chain of Multi-Adaptive Processors in a Dual In-Line Memory Module Format" which is a continuation-in-part of patent application Ser. No. 09/755,744 filed Jan. 5, 2001 now abandoned which is a divisional patent application of U.S. patent application Ser. No. 09/481,902 filed Jan. 12, 2000, now U.S. Pat. No. 6,247,110, which is a continuation of Ser. No. 08/992,763, filed Dec. 17, 1997, now U.S. Pat. No. 6,076,152, all of which are assigned to SRC Computers, Inc., Colorado Springs, Colo., the assignee of the present invention, the disclosures of which are herein specifically incorporated in their entirety by this reference.

BACKGROUND OF THE INVENTION

The present invention relates, in general, to the field of reconfigurable processor-based computing systems. More particularly, the present invention relates to a switch/network adapter port incorporating shared memory resources selectively accessible by a direct execution logic element (such as a reconfigurable computing element comprising one or more field programmable gate arrays "FPGAs") and one or more dense logic devices comprising commercially available microprocessors, digital signal processors ("DSPs"), application specific integrated circuits ("ASICs") and other typically fixed logic components having relatively high clock rates.

As disclosed in one or more representative embodiments illustrated and described in the aforementioned patents and patent applications, SRC Computers, Inc. proprietary Switch/Network Adapter Port technology (SNAP™, a trademark of SRC Computers, Inc., assignee of the present invention) has previously been enhanced such that the signals from two or more dual in-line memory module ("DIMM") (or Rambus™ in-line memory module "RIMM") slots are routed to a common control chip.

Physically, in a by-two configuration, two DIMM form factor switch/network adapter port boards may be coupled together using rigid flex circuit construction to form a single assembly. One of the DIMM boards may also be populated with a control field programmable gate array ("FPGA") which may have the signals from both DIMM slots routed to it. The control chip then samples the data off of both slots using the independent clocks of the slots. The data from both slots is then used to form a data packet that is then sent to other parts of the system. In a similar manner, the technique may be utilized in conjunction with more than two DIMM slots, for example, four DIMM slots in a four-way interleaved system.

In operation, an interleaved memory system may use two or more memory channels running in lock-step wherein a connection is made to one of the DIMM slots and the signals derived are used in conjunction with the original set of switch/network adapter port board signals. In operation, this effectively doubles (or more) the width of the data bus into and out of the memory. This technique can be implemented in conjunction with the proper selection of a memory and input/output ("I/O") controller ("North Bridge") chip that supports interleaved memory.

Currently described in the literature is a reconfigurable computing development environment called "Pilchard" which plugs into a personal computer DIMM slot. See, for example, "Pilchard—A Reconfigurable Computing Platform with Memory Slot Interface" developed at the Chinese University of Hong Kong under a then existing license and utilizing SRC Computers, Inc. technology. The Pilchard system, and other present day systems rely on relatively long column address strobe ("CAS") latencies to enable the FPGA to process the memory transactions and are essentially slaves to the memory and I/O controller.

With the speed gap ever increasing between the processor speeds and the memory subsystem, processor design has been optimized to keep the cache subsystem filled with data that will be needed by the program currently executing on the processor. Thus, the processor itself is becoming less efficient at performing the large block transfers that may be required in certain systems utilizing currently available switch/network devices.

SUMMARY OF THE INVENTION

In order to increase processor operational efficiency in conjunction with a switch/network adapter port, the present invention advantageously incorporates and properly allocates memory resources, such as dynamic random access memory ("DRAM"), located on the module itself. Functionally, this memory appears to the dense logic device (e.g. a microprocessor) to be like other system memory and no time penalties are incurred when reading to, or writing from, it.

Through the use of an access coordination mechanism, the control of this memory can be handed off to the switch/network adapter port memory controller. Once in control, the controller can move data between the memory resources and the computer network, based for example, on control parameters that may be located in on-board registers. This data movement is performed at the maximum rate that the memory devices themselves can sustain, thereby providing the highest performance link to the other network devices such as direct execution logic devices such as Multi-Adaptive Processing elements (MAP® a trademark of SRC Computers, Inc.), common memory boards and the like.

Unlike the Pilchard system described previously, the system and method of the present invention does not need to rely on relatively long CAS memory latencies to enable the associated FPGA to process the memory transactions. Moreover, the system and method of the present invention functions as a true peer to the system memory and I/O controller and access to the shared memory resources is arbitrated for between the memory and I/O controller and the switch/network adapter port controller.

Further, with increasing system security demands, as well as other functions that require unique memory address access patterns, the addition of a programmable memory controller to the system/network adapter port control unit enables this improved system to meet these needs. Functionally, the memory controller is enabled such that the address access patterns utilized in the performance of the data movement to and from the collocated memory resources is programmable. This serves to effectively eliminate the performance penalty that is common when performing scatter/gather and other similar functions.

In a representative embodiment of the present invention disclosed herein, the memory and I/O controller, as well as the enhanced switch/network adapter port memory ("SNAPM™") controller, can control the common memory resources on the SNAPM modules through the inclusion of various data and address switches (e.g. field effect transistors "FETs", or the like) and tri-stable latches. These switching resources and latches are configured such that the data and address lines may be driven by either the memory and I/O controller or the SNAPM memory controller while complete DIMM (and RIMM or other memory module format) functionality is maintained. Specifically, this may be implemented in various ways including the inclusion of a number of control registers added to the address space accessible by the memory and I/O controller which are used to coordinate the use of the shared memory resources.

In operation, when the memory and I/O controller is in control, the SNAPM memory controller is barred from accessing the DRAM memory. Conversely, when the SNAPM memory controller is in control, the address/control and data buses from the memory and I/O controller are disconnected from the DRAM memory. However, the SNAPM memory controller continues to monitor the address and control bus for time critical commands such as memory refresh commands. Should the memory and I/O controller issue a refresh command while the SNAPM memory controller is in control of the DRAM memory, it will interleave the refresh command into its normal command sequence to the DRAM devices. Additionally, when the memory and I/O controller is in control, the SNAPM modules monitor the address and command bus for accesses to any control registers located on the module and can accept or drive replies to these commands without switching control of the collocated memory resources.

Functionally, the SNAPM controller contains a programmable direct memory access ("DMA") engine which can perform random access and other DMA operations based on the state of any control registers or in accordance with other programmable information. The SNAPM controller is also capable of performing data re-ordering functions wherein the contents of the DRAM memory can be read out and then rewritten in a different sequence.

Particularly disclosed herein is a computer system comprising at least one dense logic device, a controller for coupling the dense logic device to a control block and a memory bus, a plurality of memory module slots coupled to the memory bus, an adapter port including shared memory resources associated with a subset of the plurality of memory module slots and a direct execution logic element coupled to the adapter port. The dense logic device and the direct execution logic element may both access the shared memory resources. In a preferred embodiment, the adapter port may be conveniently provided in a DIMM, RIMM or other memory module form factor.

Also disclosed herein is a computer system comprising at least one dense logic device, an interleaved controller for coupling the dense logic device to a control block and a memory bus, a plurality of memory slots coupled to the memory bus, an adapter port including shared memory resources associated with at least two of the memory slots and a direct execution logic element coupled to at least one of the adapter ports.

Further disclosed herein is a computer system including an adapter port for electrical coupling between a memory bus of the computer system and a network interface. The computer system comprises at least one dense logic device coupled to the memory bus and the adapter port comprises a memory resource associated with the adapter port and a control block for selectively enabling access by the dense logic device to the memory resource. In a particular embodiment disclosed herein, the computer system may further comprise an additional adapter port having an additional memory resource associated with it and the control block being further operative to selectively enable access by the dense logic device to the additional memory resource.

Broadly, the system and method of the present invention disclosed herein includes a switch/network adapter port with collocated memory that may be isolated to allow peer access to the memory by either a system memory and I/O controller or switch/network adapter port memory controller. The switch/network adapter port with on-board memory disclosed may be utilized as an interface itself and also allows the switch/network adapter port memory controller to operate directly on data retained in the shared memory resources. This enables it to prepare the data for transmission in operations requiring access to a large block of non-sequential data, such as scatter and gather. The system and method of the present invention described herein further discloses a switch/network adapter port with shared memory resources which incorporates a smart, fully parameterized DMA engine providing the capability of performing scatter/gather and other similar functions.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
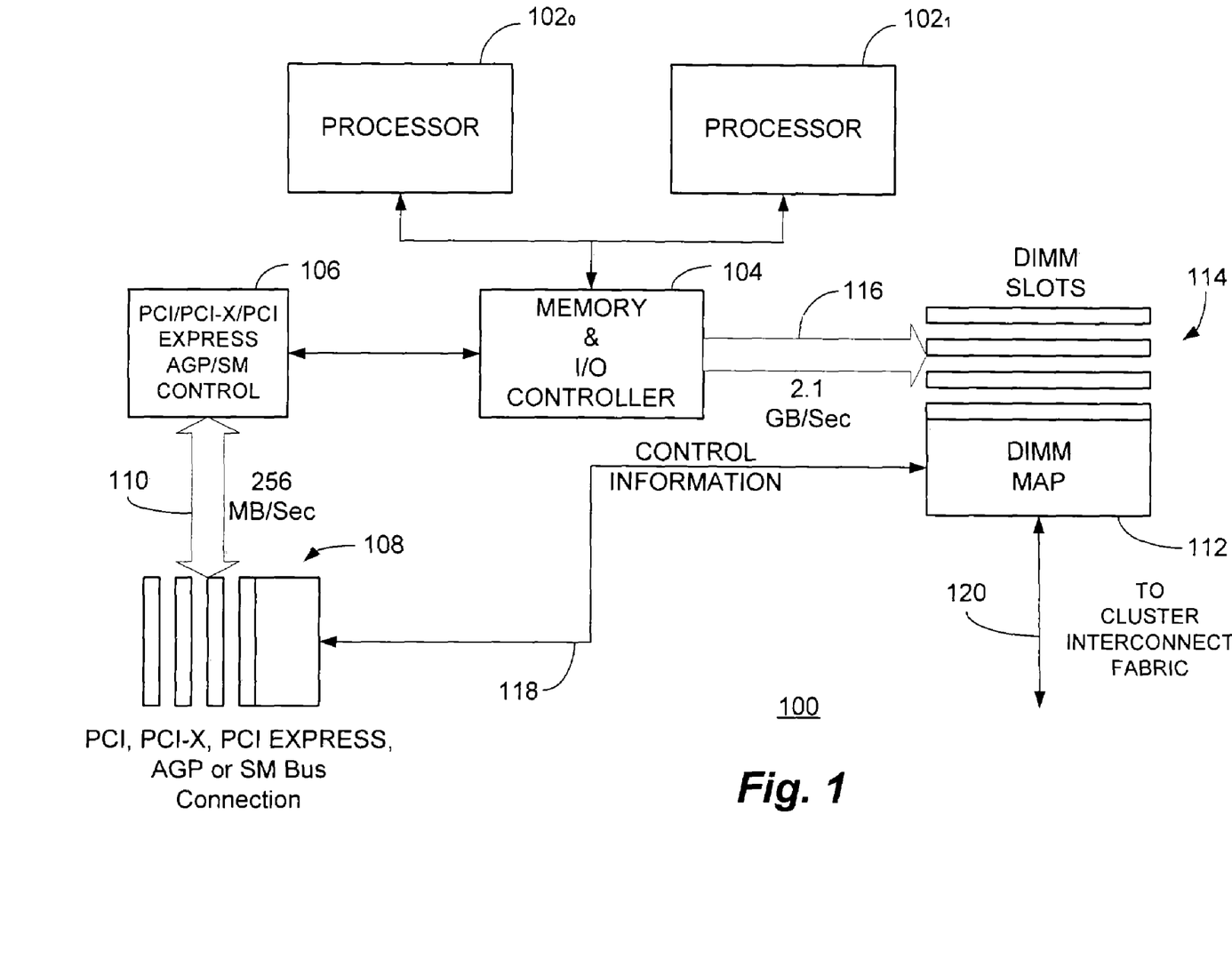
FIG. 1 is a functional block diagram of a switch/network adapter port for a clustered computing system employing a chain of multi-adaptive processors in a DIMM format functioning as direct execution logic to significantly enhance data transfer rates over that otherwise available from the peripheral component interconnect ("PCI") bus.

With reference now to FIG. 1, a functional block diagram of an exemplary embodiment of a computer system 100 is shown comprising a switch/network adapter port for clustered computers employing a chain of multi-adaptive processors functioning as direct execution logic elements in a DIMM format to significantly enhance data transfer rates over that otherwise available from the peripheral component interconnect ("PCI") bus.

In the particular embodiment illustrated, the computer system 100 includes one or more dense logic devices in the form of processors $102_0$ and $102_1$ which are coupled to an associated memory and I/O controller 104 (e.g. a "North Bridge"). In the operation of the particular embodiment illustrated, the controller 104 sends and receives control information from a separate PCI control block 106. It should be noted, however, that in alternative implementations of the present invention, the controller 104 and/or the PCI control block 106 (or equivalent) may be integrated within the processors 102 themselves and that the control block 106 may also be an accelerated graphics port ("AGP") or system maintenance ("SM") control block. The PCI control block 106 is coupled to one or more PCI card slots 108 by means of a relatively low bandwidth PCI bus 110 which allows data transfers at a rate of substantially 256 MB/sec. In alternative embodiments, the card slots 108 may alternatively comprise PCI-X, PCI Express, accelerated graphics port ("AGP") or system maintenance ("SM") bus connections.

The controller 104 is also conventionally coupled to a number of DIMM slots 114 by means of a much higher bandwidth DIMM bus 116 capable of data transfer rates of substantially 2.1 GB/sec. or greater. In accordance with a particular implementation of the system shown, a DIMM MAP® element 112 may be associated with, or physically located within, one of the DIMM slots 114. Control information to or from the DIMM MAP® element 112 may be provided by means of a connection 118 interconnecting the PCI bus 110 and the DIMM MAP® element 112. The DIMM MAP® element 112 then may be coupled to another clustered computer MAP® element by means of a cluster interconnect fabric connection 120 connected to MAP® chain ports. It should be noted that, the DIMM MAP® element 12 may also comprise a Rambus™ DIMM ("RIMM") MAP® element.

Since the DIMM memory located within the DIMM slots 114 comprises the primary storage location for the microprocessor(s) $102_0$, $102_1$, it is designed to be electrically very "close" to the processor bus and thus exhibit very low latency. As noted previously, it is not uncommon for the latency associated with the DIMM to be on the order of only 25% of that of the PCI bus 110. By, in essence, harnessing this bandwidth as an interconnect between computer systems 100, greatly increased cluster performance may be realized as disclosed in the aforementioned patents and patent applications.

To this end, by placing the DIMM MAP® element 112, in one of the PC's DIMM slots 114, its control chip can accept the normal memory "read" and "write" transactions and convert them to a format used by an interconnect switch or network. To this end, each MAP® element 112 may also include chain ports to enable it to be coupled to other MAP® elements 112. Through the utilization of the chain port to connect to the external clustering fabric over connection 120, data packets can then be sent to remote nodes where they can be received by an identical board. In this particular application, the DIMM MAP® element 112 would extract the data from the packet and store it until needed by the receiving processor 102.

This technique results in the provision of data transfer rates several times higher than that of any currently available PC interface such as the PCI bus 110. However, the electrical protocol of the DIMMs is such that once the data arrives at the receiver, there is no way for a DIMM module within the DIMM slots 114 to signal the microprocessor 102 that it has arrived, and without this capability, the efforts of the processors 102 would have to be synchronized through the use of a continued polling of the DIMM MAP® elements 112 to determine if data has arrived. Such a technique would totally consume the microprocessor 102 and much of its bus bandwidth thus stalling all other bus agents.

To avoid this situation, the DIMM MAP® element 112 may be further provided with the connection 118 to allow it to communicate with the existing PCI bus 110 which could then generate communications packets and send them via the PCI bus 110 to the processor 102. Since these packets would account for but a very small percentage of the total data moved, the low bandwidth effects of the PCI bus 110 are minimized and conventional PCI interrupt signals could also be utilized to inform the processor 102 that data has arrived. In accordance with another possible implementation, the system maintenance ("SM") bus (not shown) could also be used to signal the processor 102. The SM bus is a serial current mode bus that conventionally allows various devices on the processor board to interrupt the processor 102. In an alternative embodiment, the accelerated graphics port ("AGP") may also be utilized to signal the processor 102.

With a DIMM MAP® element 112 associated with what might be an entire DIMM slot 114, the system will allocate a large block of addresses, typically on the order of 1 GB, for use by the DIMM MAP® element 112. While some of these can be decoded as commands, many can still be used as storage. By having at least as many address locations as the normal input/output ("I/O") block size used to transfer data from peripherals, the conventional Intel™ chip sets used in most personal computers (including controller 104) will allow direct I/O transfers into the DIMM MAP® element 112. This then allows data to arrive from, for example, a disk and to pass directly into a DIMM MAP® element 112. It then may be altered in any fashion desired, packetized and transmitted to a remote node over connection 120. Because both the disk's PCI bus 110 and the DIMM MAP® element 112 and DIMM slots 114 are controlled by the PC memory controller 104, no processor bus bandwidth is consumed by this transfer.

It should also be noted that in certain computer systems, several DIMMs within the DIMM slots 114 may be interleaved to provide wider memory access capability in order to increase memory bandwidth. In these systems, the previously described technique may also be utilized concurrently in several DIMM slots 114. Nevertheless, regardless of the particular implementation chosen, the end result is a DIMM-based MAP® element 112 having one or more connections to the PCI bus 110 and an external switch or network over connection 120 which results in many times the performance of a PCI-based connection alone as well as the ability to process data as it passes through the interconnect fabric.

Figure 2A:
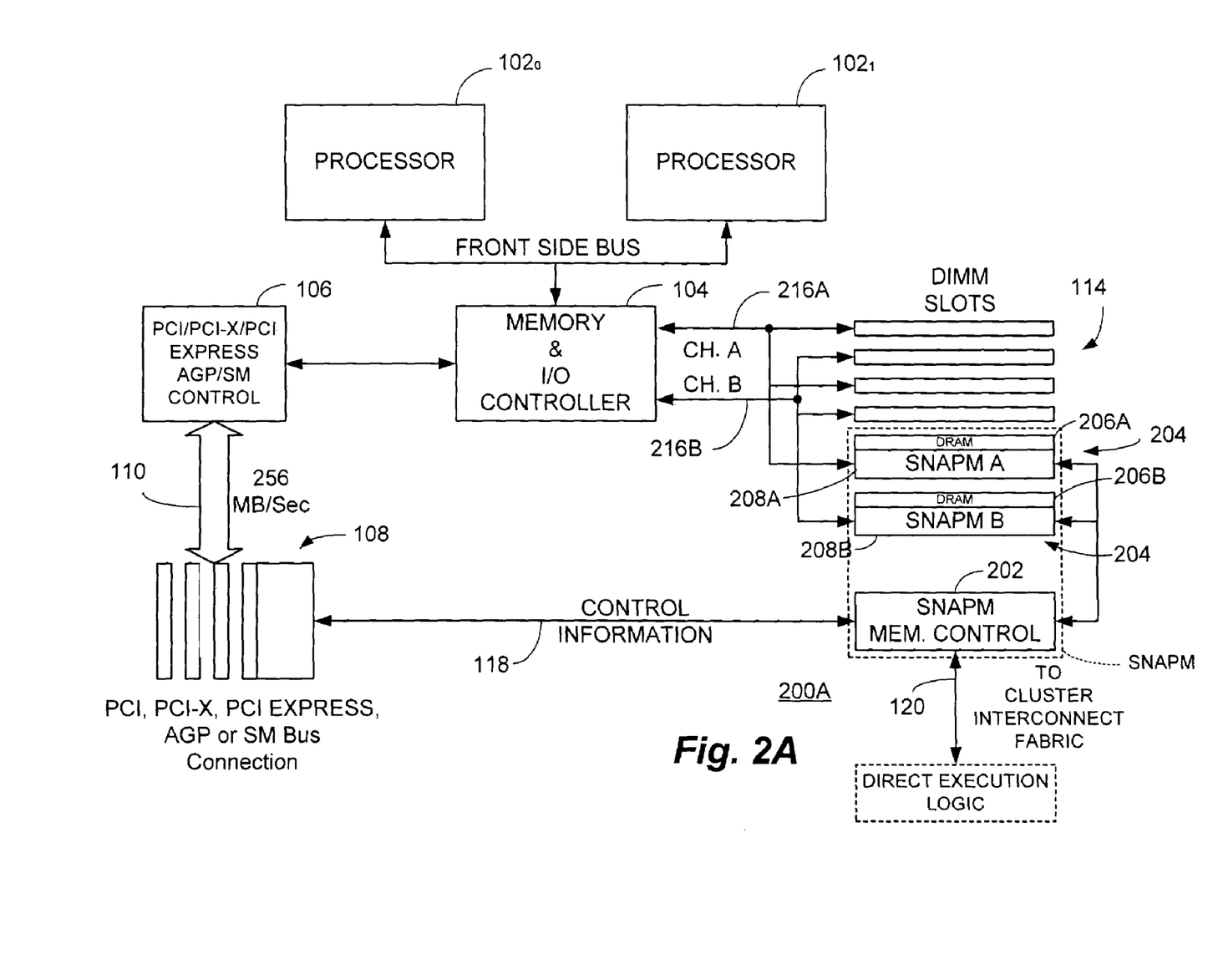
FIG. 2A is a functional block diagram of an exemplary embodiment of a switch/network adapter port incorporating collocated shared memory resources illustrating in a by-two configuration of interleaved DIMM slot form factor SNAPM elements coupled to a common SNAPM memory control element for coupling to a cluster interconnect fabric including one or more direct execution logic devices such as MAP® elements.

With reference additionally now to FIG. 2A, a functional block diagram of an exemplary embodiment of a switch/network adapter port 200A incorporating collocated common memory resources in accordance with the present invention is shown. In this regard, like structure and functionality to that disclosed with respect to the foregoing figure is here like numbered and the foregoing description thereof shall suffice herefor. The switch/network adapter port with common memory ("SNAPM") 200A is shown in an exemplary by-two configuration of interleaved DIMM slot form factor SNAPM elements 204 (SNAPM A and SNAPM B) each coupled to a common control element 202 (comprising, together with the two SNAPM elements 204 "SNAPM") and with each of the SNAPM elements 204 including respective DRAM memory 206A and 206B in conjunction with associated switches and buses 208A and 208B respectively as will be more fully described hereinafter. In this embodiment, the controller 104 is an interleaved memory controller bi-directionally coupled to the DIMM slots 114 and SNAPM elements 204 by means of a Channel A 216A and a Channel B 216B.

Figure 2B:
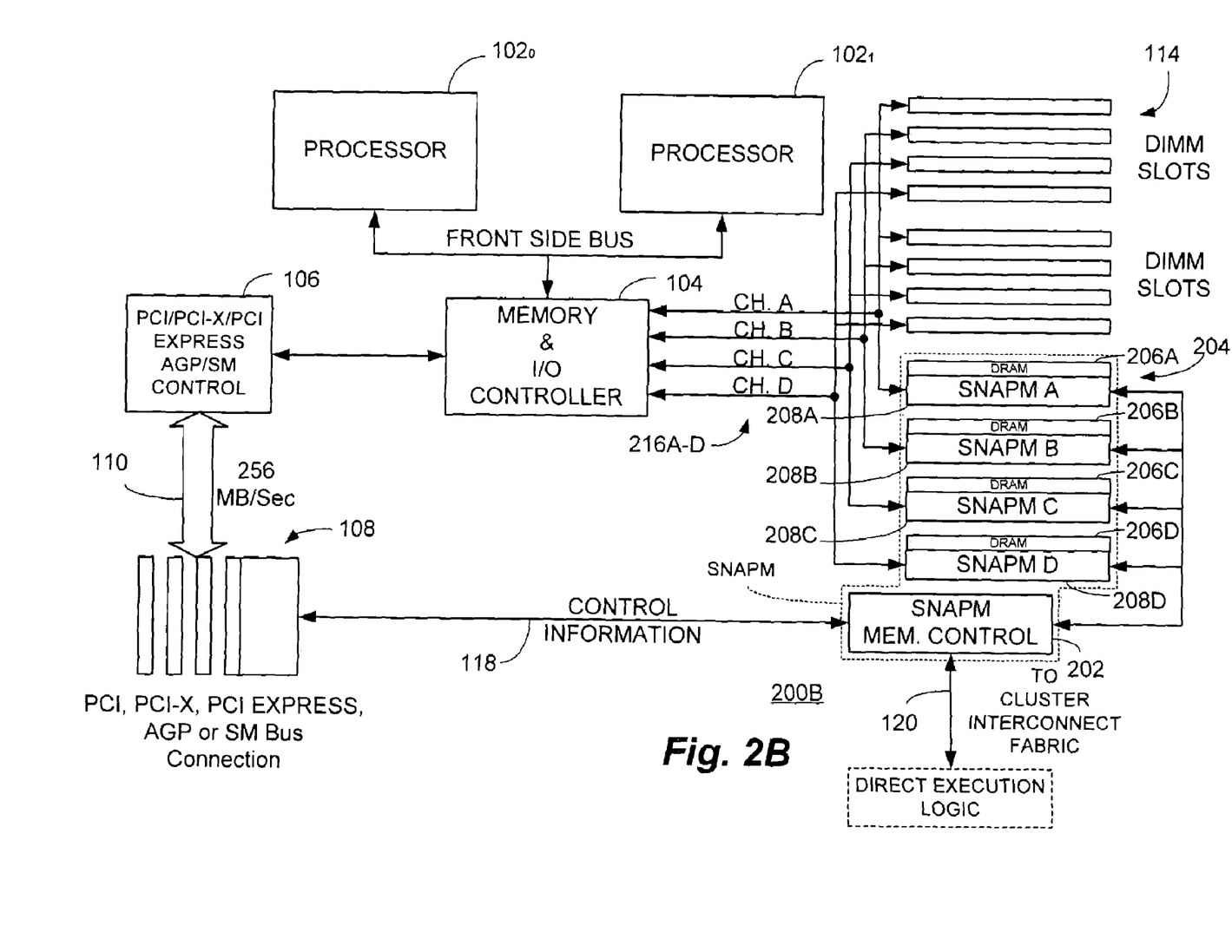
FIG. 2B is a further functional block diagram of another exemplary embodiment of a switch/network adapter port incorporating collocated shared memory resources in accordance with the present invention illustrating a by-four configuration of interleaved DIMM slot form factor SNAPM elements coupled to a common SNAPM memory control element.

With reference additionally now to FIG. 2B, a functional block diagram of another exemplary embodiment of a switch/network adapter port 200B incorporating collocated common memory resources in accordance with the present invention is shown. Again, like structure and functionality to that disclosed with respect to the preceding figures is like numbered and the foregoing description thereof shall suffice herefor. The switch/network adapter port 200B with common memory is shown in a by-four configuration of interleaved DIMM slot form factor SNAPM elements 204 coupled to a common SNAPM memory control element 202 (comprising, together with the four SNAPM elements 204 "SNAPM"). In this embodiment, the controller 104 is again an interleaved memory controller bi-directionally coupled to the DIMM slots 114 and SNAPM elements 204 by means of a respective Channel A 216A, Channel B 216B, Channel C 216C and Channel D 216D.

Figure 3:
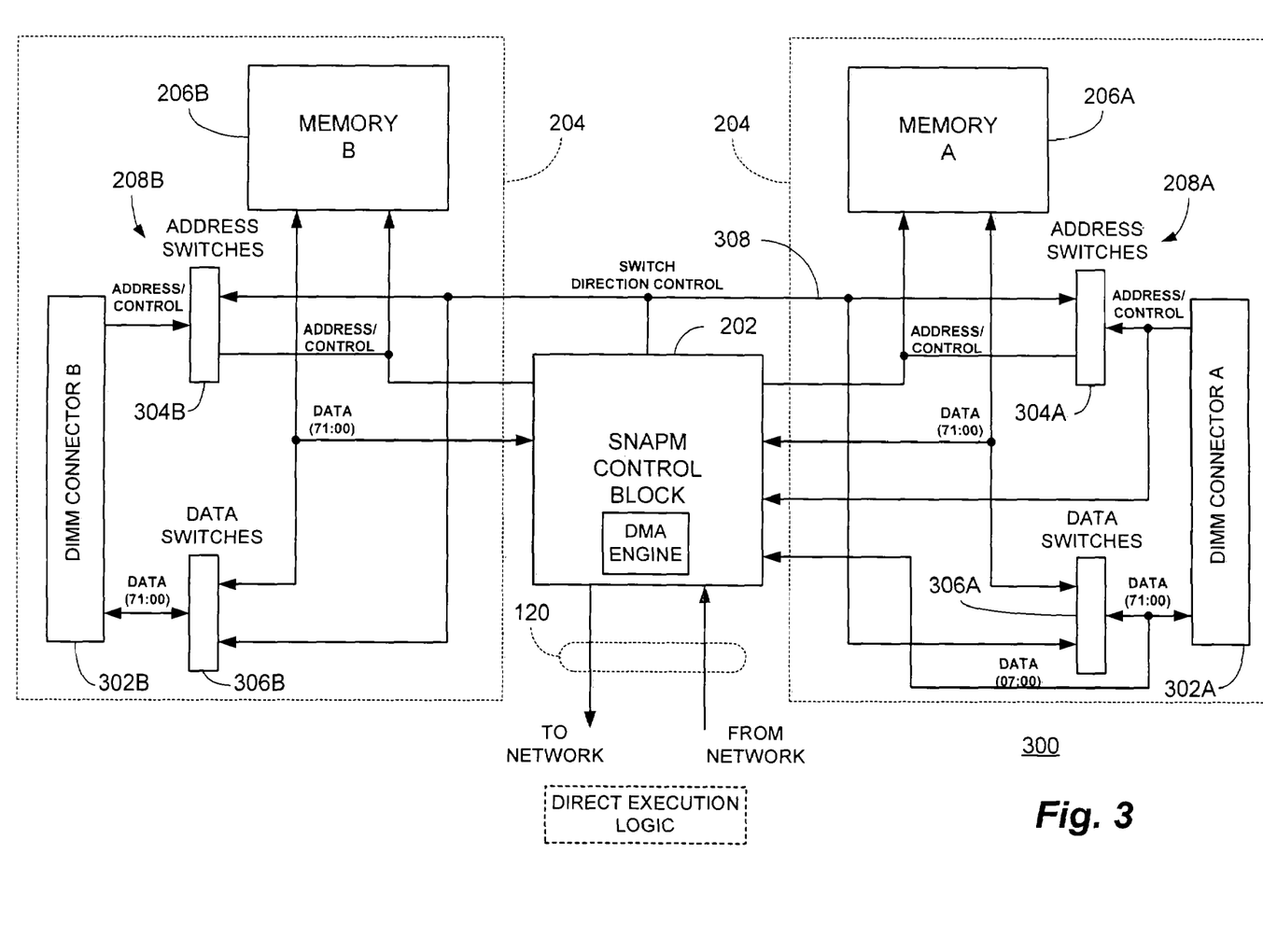
FIG. 3 is a functional block diagram of a representative embodiment of a by-two SNAPM system in accordance with the present invention comprising a pair of circuit boards, each of which may be physically and electrically coupled into one of two DIMM memory slots, and one of which may contain a SNAPM control block in the form of a field programmable gate array ("FPGA") functioning as the SNAPM memory control block of the preceding FIGS. 2A and 2B.

With reference additionally now to FIG. 3, a functional block diagram of a representative embodiment of a by-two SNAPM system 300 in accordance with the present invention is shown. The SNAPM system, in the exemplary embodiment shown, comprises a pair of circuit boards 204, each of which may be physically and electrically coupled into one of two DIMM (RIMM or other memory module form factor) memory slots, and one of which may contain a SNAPM control block 202 in the form of, for example, an FPGA programmed to function as the SNAPM memory control block of the preceding FIGS. 2A and 2B.

Each of the SNAPM circuit boards 204 comprises respective collocated common memory resources 206A ("Memory A") and 206B ("Memory B") which may be conveniently provided in the form of DRAM, SRAM or other suitable memory technology types. Each of the memory resources 206A and 206B is respectively associated with additional circuitry 208A and 208B comprising, in pertinent part, respective DIMM connectors 302A and 302B, a number of address switches 304A and 304B and a number of data switches 306A and 306B along with associated address/control and data buses. The address switches 304A and 304B and data switches 306A and 306B are controlled by a switch direction control signal provided by the SNAPM control block 202 on control line 308 as shown. The address switches 304 and data switches 306 may be conveniently provided as FETs, bipolar transistors or other suitable switching devices. The network connections 120 may be furnished, for example, as a flex connector and corresponds to the cluster interconnect fabric of the preceding figures for coupling to one or more elements of direct execution logic such as MAP® elements available from SRC Computers, Inc.

Figure 4A:
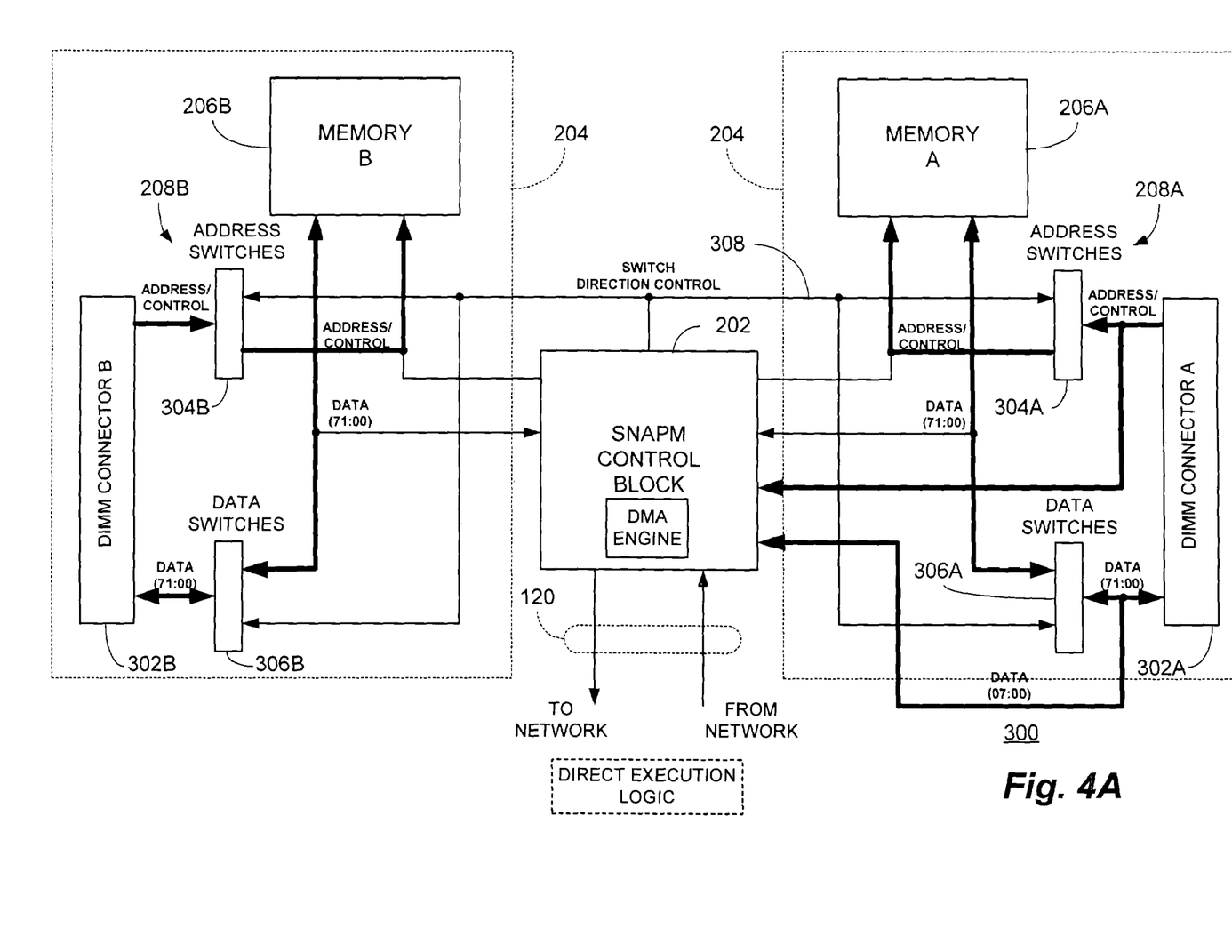
FIG. 4A is a corresponding functional block diagram of the embodiment of the preceding figure wherein the memory and I/O controller drives the address/control and data buses for access to the shared memory resources of the SNAPM elements through the respective address and data switches.

With reference additionally now to FIG. 4A, a corresponding functional block diagram of the embodiment of the preceding figure is shown wherein the memory and I/O controller (element 104 of FIGS. 1, 2A and 2B) drives the address/control and data buses for access to the shared memory resources 206 of the SNAPM elements 204 through the respective address and data switches 304 AND 306 in accordance with the state of the switch direction control signal on control line 308.

Figure 4B:
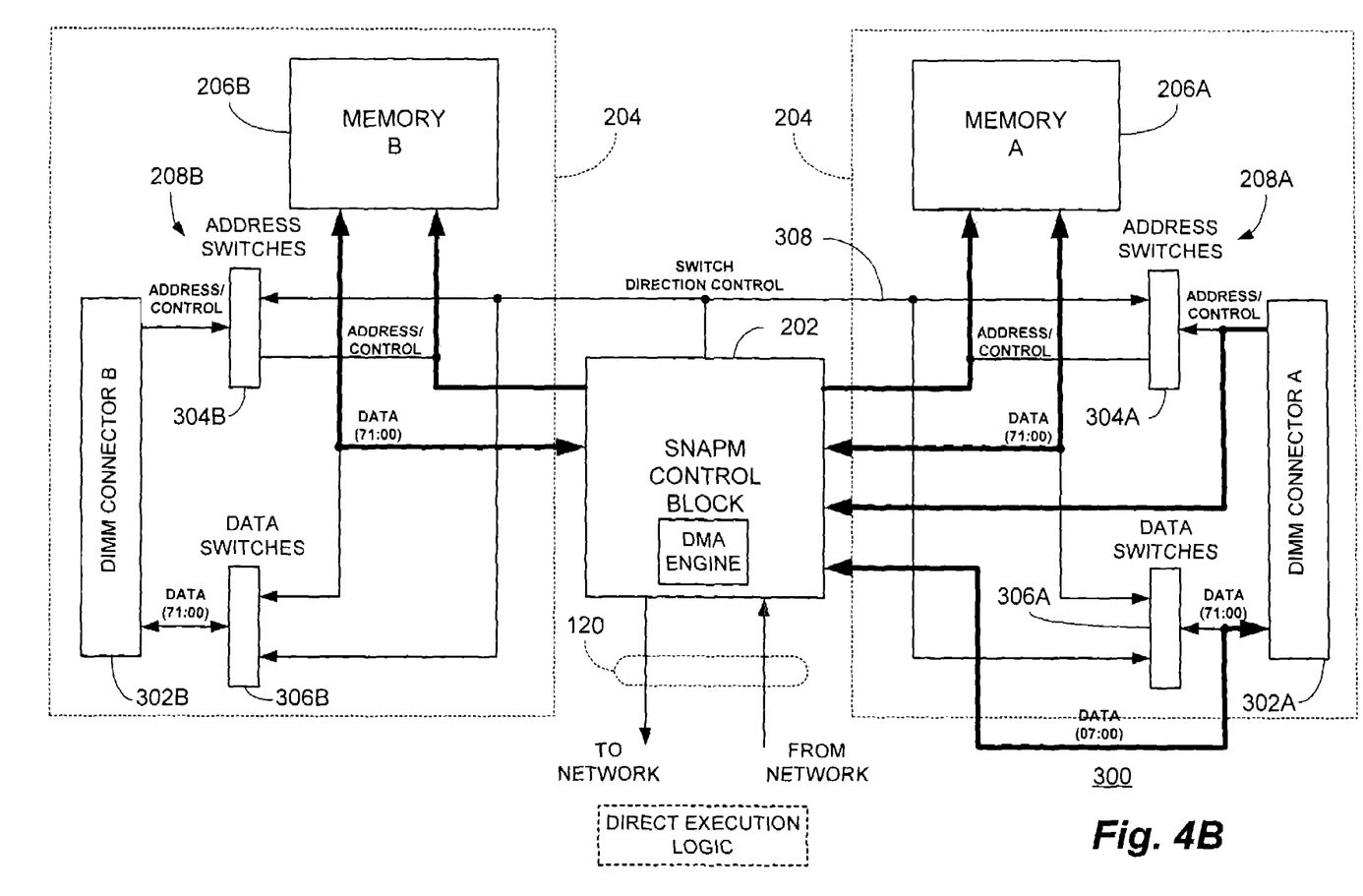
FIG. 4B is an accompanying functional block diagram of the embodiment of FIG. 3 wherein the SNAPM memory control block provides access to the shared memory resources and disconnects the address/control and data buses from the system memory and I/O controller.

With reference additionally now to FIG. 4B, an accompanying functional block diagram of the embodiment of FIG. 3 is shown wherein the SNAPM memory control block 202 provides access to the shared memory resources 206 and disconnects the address/control and data buses from the system memory and I/O controller (element 104 of FIGS. 1, 2A and 2B) in accordance with an opposite state of the switch direction control signal on control line 308.

As shown with respect to FIGS. 4A and 4B, the memory and I/O controller (element 104 of FIGS. 1, 2A and 2B), as well as the SNAPM memory controller 202, can control the common memory resources 206 on the SNAPM modules 204. The switches 304 and 306 are configured such that the data and address lines may be driven by either the memory and I/O controller 104 or the SNAPM memory controller 202 while complete DIMM (and RIMM or other memory module format) functionality is maintained. Specifically, this may be implemented in various ways including the inclusion of a number of control registers added to the address space accessible by the memory and I/O controller 104 which are used to coordinate the use of the shared memory resources 206. In the embodiment illustrated, the least significant bit ("LSB") data lines (07:00) of lines (71:00) and/or selected address bits may be used to control the SNAPM control block 202, and hence, the allocation and use of the shared memory resources 206.

In operation, when the memory and I/O controller 104 is in control, the SNAPM memory controller 202 is barred from accessing the DRAM memory 206. Conversely, when the SNAPM memory controller 202 is in control, the address/control and data buses from the memory and I/O controller 104 are disconnected from the DRAM memory 206. However, the SNAPM memory controller 202 continues to monitor the address and control bus for time critical commands such as memory refresh commands. Should the memory and I/O controller 104 issue a refresh command while the SNAPM memory controller 202 is in control of the DRAM memory 206, it will interleave the refresh command into its normal command sequence to the DRAM devices. Additionally, when the memory and I/O controller 104 is in control, the SNAPM modules 204 monitor the address and command bus for accesses to any control registers located on the module and can accept or drive replies to these commands without switching control of the collocated memory resources 206.

While there have been described above the principles of the present invention in conjunction with specific module configurations and circuitry, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer system comprising:
    at least one dense logic device;
    a controller coupling said at least one dense logic device to a control block and a memory bus;
    one or more memory module slots coupled to said memory bus;
    an adapter port associated with a subset of said one or more memory module slots, said adapter port including associated memory resources, wherein said control block provides control information to said adapter port and wherein said adapter port shares access control to said memory resources with said controller such that when said controller is in control of said memory resources said adapter port is barred from accessing said memory resources and when said adapter port is in control of said memory resources said controller is disconnected from said memory resources and wherein said controller is disconnected from said memory resources said adapter port monitors said control block for control information; and
    at least one direct execution logic element coupled to said adapter port, said memory resources being substantially equally accessible by said at least one dense logic device and said at least one direct execution logic element.

2. The computer system of claim 1 wherein said controller comprises an interleaved memory controller that is bi-directionally coupled to the at adaptor port and said one or more memory module slots, and wherein said controller includes a plurality of control registers configured to control shared use of said memory resources.

3. The computer system of claim 1 wherein said plurality of memory module slots comprise DIMM memory module slots.

4. The computer system of claim 3 wherein said adapter port comprises a DIMM physical format for retention within one of said DIMM memory module slots.

5. The computer system of claim 1 wherein said plurality of memory module slots comprise in-line memory module serial interface slots.

6. The computer system of claim 5 wherein said adapter port comprises a in-line memory module serial interface physical format for retention within one of said in-line memory module serial interface slots.

7. The computer system of claim 1 wherein said control block provides control information to said direct execution logic element.

8. The computer system of claim 1 wherein said control block comprises a peripheral bus control block.

9. The computer system of claim 8 wherein said peripheral bus control block provides control information to said adapter port.

10. The computer system of claim 8 wherein said peripheral control block provides control information to said direct execution logic element.

11. The computer system of claim 1 wherein said control block comprises a graphics control block.

12. The computer system of claim 11 wherein said graphics control block provides control information to said adapter port.

13. The computer system of claim 11 wherein said graphics control block provides control information to said direct execution logic element.

14. The computer system of claim 1 wherein said control block comprises a systems maintenance control block.

15. The computer system of claim 14 wherein said systems maintenance control block provides control information to said adapter port.

16. The computer system of claim 14 wherein said systems maintenance control block provides control information to said direct execution logic element.

17. The computer system of claim 1 wherein said direct execution logic element comprises a reconfigurable processor element.

18. The computer system of claim 1 wherein said direct execution logic element is operative to alter data received from said controller on said memory bus.

19. The computer system of claim 1 wherein said direct execution logic element is operative to alter data received from an external source prior to placing altered data on said memory bus.

20. The computer system of claim 1 wherein said direct execution logic element comprises:
    a control block coupled to said adapter port.

21. The computer system of claim 20 wherein said direct execution logic element further comprises:
    at least one field programmable gate array configurable to perform an identified algorithm on and operand provided thereto by said adapter port.

22. The computer system of claim 21 further comprising:
    a dual-ported memory block coupling a control block coupled to said adapter port to said at least one field programmable gate array.

23. The computer system of claim 20 wherein said direct execution logic element further comprises:
    a read only memory associated with said control block for providing configuration information thereto.

24. The computer system of claim 1 wherein said direct execution logic element comprises:
    a chain port for coupling said direct execution logic element to another direct execution logic element.

25. A computer system comprising:
    at least one dense logic device;
    an interleaved controller coupling said at least one dense logic device to a control block and a memory bus;
    a plurality of memory slots coupled to said memory bus;
    an adapter port associated with at least two of said plurality of memory slots, each of said adapter port including associated memory resources, wherein said control block provides control information to said adapter port and wherein said adapter port shares access control to said memory resources with said controller such that when said controller is in control of said memory resources said adapter port is barred from accessing said memory resources and when said adapter port is in control of said memory resources said controller is disconnected from said memory resources and wherein said controller is disconnected from said memory resources said adapter port monitors said control block for control information; and a direct execution logic element coupled to at least one of said adapter ports, said memory resources being substantially equally accessible by said at least one dense logic device and said direct execution logic element.

26. The computer system of claim 25 wherein said plurality of memory slots comprise DIMM memory module slots.

27. The computer system of claim 26 wherein said adapter port comprises a DIMM physical format for retention within one of said DIMM memory module slots.

28. The computer system of claim 25 wherein said plurality of memory slots comprise in-line memory module serial interface slots.

29. The computer system of claim 28 wherein said adapter port comprises a in-line memory module serial interface physical format for retention within one of said in-line memory module serial interface slots.

30. The computer system of claim 25 wherein said control block provides control information to said direct execution logic element.

31. The computer system of claim 25 wherein said control block comprises a peripherai bus controi block.

32. The computer system of claim 31 wherein said peripheral bus control block provides control information to said adapter port.

33. The computer system of claim 31 wherein said peripheral control block provides control information to said direct execution logic element.

34. The computer system of claim 25 wherein said control block comprises a graphics control block.

35. The computer system of claim 34 wherein said graphics control block provides control information to said adapter port.

36. The computer system of claim 34 wherein said graphics control block provides control information to said direct execution logic element.

37. The computer system of claim 25 wherein said control block comprises a systems maintenance control block.

38. The computer system of claim 37 wherein said systems maintenance control block provides control information to said adapter port.

39. The computer system of claim 37 wherein said systems maintenance control block provides control information to said direct execution logic element.

40. The computer system of claim 25 wherein said control block comprises a PCI-X control block.

41. The computer system of claim 40 wherein said PCI-X control block provides control information to said adapter port.

42. The computer system of claim 40 wherein said PCI-X control block provides control information to said direct execution logic element.

43. The computer system of claim 25 wherein said control block comprises a PCI Express control block.

44. The computer system of claim 43 wherein said PCI Express control block provides control information to said adapter port.

45. The computer system of claim 43 wherein said PCI Express control block provides control information to said direct execution logic element.

46. The computer system of claim 25 wherein said direct execution logic element comprises a reconfigurable processor element.

47. The computer system of claim 25 wherein said direct execution logic element is operative to alter data received from said controller on said memory bus.

48. The computer system of claim 25 wherein said direct execution logic element is operative to alter data received from an external source prior to placing altered data on said memory bus.

49. The computer system of claim 25 wherein said direct execution logic element comprises:

a control block coupled to said adapter port.

50. The computer system of claim 49 wherein said direct execution logic element further comprises:

at least one field programmable gate array configurable to perform an identified algorithm on and operand provided thereto by said adapter port.

51. The computer system of claim 50 further comprising:

a dual-ported memory block coupling a control block coupled to said adapter port to said at least one field programmable gate array.

52. The computer system of claim 49 wherein said direct execution logic element further comprises:

a read only memory associated with said control block for providing configuration information thereto.

53. The computer system of claim 25 wherein said direct execution logic element comprises:

a chain port for coupling said processor element to another direct execution logic element.

54. A computer system including an adapter port for electrical coupling between a memory bus of said computer system and a network interface, said computer system comprising at least one dense logic device coupled to said memory bus and said memory bus comprising at least one memory module slot, said adapter port comprising:

a memory resource associated with said adapter port wherein said adapter port is configured for physical retention within said at least one memory module slot; and a control block for selectively enabling access by said at least one dense logic device to said memory resource, wherein said control block provides control information to said adapter port and wherein said adapter port shares access control to said memory resource with said controller such that when said controller is in control of said memory resource said adapter port is barred from accessing said memory resource and when said adapter port is in control of said memory resource said controller is disconnected from said memory resource and wherein said controller is disconnected from said memory resource said adapter port monitors said control block for control information.

55. The computer system of claim 54 wherein said control block is further operational to selectively preclude access by said at least one dense logic device to said memory resource.

56. The computer system of claim 54 further comprising:

at least one direct execution logic element coupled to said network interface.

57. The computer system of claim 56 wherein said control block is further operational to alternatively enable substantially equal access to said memory resource by said at least one dense logic device and said at least one direct execution logic element.

58. The computer system of claim 54 wherein said at least one memory module slot comprises a DIMM slot.

59. The computer system of claim 54 wherein said at least one memory module slot comprises a in-line memory module serial interface slot.

60. The computer system of claim 54 further comprising:
an additional adapter port;
an additional memory resource associated with said additional adapter port, said control block further operative to selectively enable access by said at least one dense logic device to said additional memory resource.

61. The computer system of claim 60 wherein said control block is further operational to selectively preclude access by said at least one dense logic device to said memory resource and said additional memory resource.

62. The computer system of claim 61 further comprising at least one direct execution logic element coupled to said network interface.

63. The computer system of claim 62 wherein said control block is further operational to alternatively enable access to said memory resource and said additional memory resource by said at least one dense logic device and said at least one direct execution logic element.

64. The computer system of claim 60 wherein said memory bus further comprises first and second memory module slots for physical retention of said at least one adapter port and said additional adapter port respectively.

65. The computer system of claim 64 wherein said first and second memory module slots comprise DIMM slots.

66. The computer system of claim 64 wherein said first and second memory module slots comprise in-line memory module serial interface slots.

67. The computer system of claim 60 wherein said control block is located on a module comprising said adapter port.

68. The computer system of claim 54 wherein said computer system further comprises:
a memory and I/O controller interposed between said at least one dense logic device and said memory bus.

69. The computer system of claim 68 wherein said memory and I/O controller comprises an interleaved memory controller.

70. The computer system of claim 54 wherein said adapter port comprises a number of switches interposed between said memory bus and said memory resource controllable by said control block.

71. The computer system of claim 70 wherein said switches comprise field effect transistors.

72. The computer system of claim 70 wherein said switches have a first condition thereof for coupling said dense logic device to said memory resource and a second condition thereof for coupling said network interface to said memory resource.

73. The computer system of claim 54 wherein said memory bus comprises address/control and data portions thereof.

74. The computer system of claim 54 wherein said memory bus provides address/control and data inputs to said control block to at least partially control its functionality.

75. The computer system of claim 54 wherein said control block further comprises a DMA controller for providing direct memory access operations to said memory resource.

76. The computer system of claim 75 wherein said DMA controller is fully parameterized.

77. The computer system of claim 75 wherein said DMA controller enables scatter/gather functions to be implemented.

78. The computer system of claim 75 wherein said DMA controller enables irregular data access pattern functions to be implemented.

79. The computer system of claim 75 wherein said DMA controller enables data packing functions to be implemented.

80. The computer system of claim 54 wherein said memory resource may be isolated from said memory bus in response to said control block to enable access thereto by a device coupled to said network interface.

81. The computer system of claim 54 wherein said memory resource comprises random access memory.

82. The computer system of claim 81 wherein said random access memory comprises DRAM.

* * * * *

UNITED STATES PATENT AND TRADEMARK OFFICE
CERTIFICATE OF CORRECTION

PATENT NO. : 7,424,552 B2  
APPLICATION NO. : 10/618041  
DATED : September 9, 2008  
INVENTOR(S) : Lee A. Burton

It is certified that error appears in the above-identified patent and that said Letters Patent is hereby corrected as shown below:

Column 11, line 25 "peripherai" should be --peripheral--

Column 11, line 25 "controi" should be --control--

Signed and Sealed this

Sixteenth Day of December, 2008

JON W. DUDAS  
*Director of the United States Patent and Trademark Office*